US012296350B2

(12) United States Patent
Urquhart

(10) Patent No.: US 12,296,350 B2
(45) Date of Patent: May 13, 2025

(54) MIXING VALVE ASSEMBLY HAVING AN ATOMIZING SPRAY TIP

(71) Applicant: Precision Valve & Automation, Inc., Halfmoon, NY (US)

(72) Inventor: Jonathan Neal Urquhart, Saratoga Springs, NY (US)

(73) Assignee: PRECISION VALVE & AUTOMATION, INC., Halfmoon, NY (US)

( * ) Notice: Subject to any disclaimer, the term of this patent is extended or adjusted under 35 U.S.C. 154(b) by 0 days.

(21) Appl. No.: 18/066,593

(22) Filed: Dec. 15, 2022

(65) Prior Publication Data

US 2023/0122239 A1 Apr. 20, 2023

Related U.S. Application Data

(62) Division of application No. 15/583,366, filed on May 1, 2017, now abandoned.

(60) Provisional application No. 62/330,606, filed on May 2, 2016.

(51) Int. Cl.

| | |
|---|---|
| ***B05B 1/32*** | (2006.01) |
| ***B05B 7/04*** | (2006.01) |
| ***B05B 7/06*** | (2006.01) |
| ***B05B 7/24*** | (2006.01) |

(52) U.S. Cl.

CPC .............. *B05B 1/32* (2013.01); *B05B 7/0408* (2013.01); *B05B 7/066* (2013.01); *B05B 7/2489* (2013.01)

(58) Field of Classification Search

CPC ....... B05B 7/0408; B05B 7/062; B05B 7/066; B05B 7/2489; B05B 7/2497; B05B 13/0431; B05B 1/32

USPC ........................................ 239/418, 419, 432

See application file for complete search history.

(56) References Cited

U.S. PATENT DOCUMENTS

| | | | | |
|---|---|---|---|---|
| 4,370,062 | A | 1/1983 | Moody | |
| 4,948,053 | A | 8/1990 | Hufgard | |
| 5,230,608 | A * | 7/1993 | Januska | E04F 21/026 156/578 |
| 5,609,271 | A | 3/1997 | Keller et al. | |
| 5,810,254 | A * | 9/1998 | Kropfield | B29B 7/7419 239/290 |
| 5,979,794 | A * | 11/1999 | DeFillipi | B05C 5/022 239/432 |
| 6,062,492 | A * | 5/2000 | Tudor | B05B 7/0861 239/296 |
| 6,601,782 | B1 * | 8/2003 | Sandholm | B05B 7/0815 239/600 |

(Continued)

FOREIGN PATENT DOCUMENTS

| | | |
|---|---|---|
| CH | 699808 A1 | 4/2010 |
| CN | 102513265 A | 6/2012 |

(Continued)

*Primary Examiner* — Cody J Lieuwen

(74) *Attorney, Agent, or Firm* — Schmeiser, Olsen & Watts LLP

(57) ABSTRACT

A valve including a feed mechanism, a mixing element operably connected to the feed mechanism, wherein the feed mechanism delivers at least two fluids to the mixing element, the at least two fluids being mixed in the mixing element, and an air cap disposed proximate an outlet of the mixing element to atomize the mixed fluids exiting the outlet of the mixing element, is provided. Furthermore, an associated method is also provided.

17 Claims, 18 Drawing Sheets

(56) References Cited

U.S. PATENT DOCUMENTS

| | | | |
|---|---|---|---|
| 6,672,519 | B2 | 1/2004 | Hunter et al. |
| 6,695,224 | B2 | 2/2004 | Hunter |
| 7,220,457 | B2 * | 5/2007 | Anderson ............. B05B 7/0861 239/406 |
| 8,387,899 | B2 | 3/2013 | Fortier et al. |
| 2003/0236588 | A1 * | 12/2003 | Jang .................. C04B 35/62873 977/839 |
| 2007/0181599 | A1 | 8/2007 | Kosmyna et al. |
| 2012/0053726 | A1 * | 3/2012 | Peters ...................... B25J 11/00 700/254 |
| 2013/0112778 | A1 * | 5/2013 | Hiemer ............... B01F 25/4321 239/398 |
| 2015/0155448 | A1 * | 6/2015 | Matsunaga ............... B05C 5/02 438/5 |

FOREIGN PATENT DOCUMENTS

| | | | |
|---|---|---|---|
| CN | 103140294 | A | 6/2013 |
| EP | 2527041 | A1 | 11/2012 |
| GB | 2351459 | A | 1/2001 |
| WO | 2012010338 | A1 | 1/2012 |

* cited by examiner

MIXING VALVE ASSEMBLY HAVING AN ATOMIZING SPRAY TIP

CROSS-REFERENCE TO RELATED APPLICATIONS

This application is a divisional application that claims the benefit of and priority to U.S. application Ser. No. 15/583,366, filed May 1, 2017, and entitled, "Mixing Valve Assembly Having an Atomizing Spray Tip," which claims the benefit of and priority to U.S. Provisional Application No. 62/330,606, filed May 2, 2016, and entitled, "Mixing Valve Assembly Having an Atomizing Spray Tip."

FIELD OF TECHNOLOGY

The following relates to a valve having an air cap and more specifically to embodiments of a mixing valve assembly having an atomizing air cap for atomizing mixed fluids.

BACKGROUND

When applying adhesive or sealants to various surfaces, control of the spray of fluid is critical. The fluids may sometimes need to be reacted together in a mixer, wherein one or both of the fluids have a short pot life. In applications where fluid is sprayed onto a surface or substrate, the fluid(s) must be atomized. Atomizing a mixed fluid proximate an outlet can be known to sacrifice control of the spray pattern.

Thus, a need exists for an apparatus and method for metering two or more products with short or long pot lives with selective control of the spray pattern.

SUMMARY

A first aspect relates generally to a valve comprising: a feed mechanism having at least two pumps, a mixing element operably connected to the feed mechanism, wherein the feed mechanism delivers at least two fluids to the mixing element, the at least two fluids being mixed in the mixing element, and an air cap disposed proximate an outlet of the mixing element to atomize the mixed fluids exiting the outlet of the mixing element.

A second aspect relates generally to a valve comprising: a feed mechanism, the feed mechanism having a first pump and a second pump, the first pump configured to advance a first adhesive and the second pump configured to advance a second adhesive, a fluid body affixed to the feed mechanism, the fluid body receiving a portion of the first pump and a portion of the second pump, in a first end, wherein a first fluid pathway associated with the first pump and a second fluid pathway associated with the second pump, an attachment component, the attachment component affixed to a bottom surface of the fluid body, the attachment component cooperating with an end of a mixing element to removably attach the mixing element to the fluid body, wherein the mixing element mix the first adhesive and the second adhesive to form a mixed adhesive, a spray body, the spray body surrounding the mixing element, wherein the spray body includes a recessed surface having external threads, and a spray tip, the spray tip removably attached to the spray body.

A third aspect relates generally to a method comprising: providing a valve comprising a feed mechanism having at least two pumps, a mixing element operably connected to the feed mechanism, wherein the feed mechanism delivers at least two fluids to the mixing element, the at least two fluids being mixed in the mixing element, and an air cap disposed proximate an outlet of the mixing element, and atomizing the mixed fluids exiting the outlet of the mixing element, such that a defined spray pattern is maintained as the mixed fluids are delivered to a substrate.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

Figure 1:
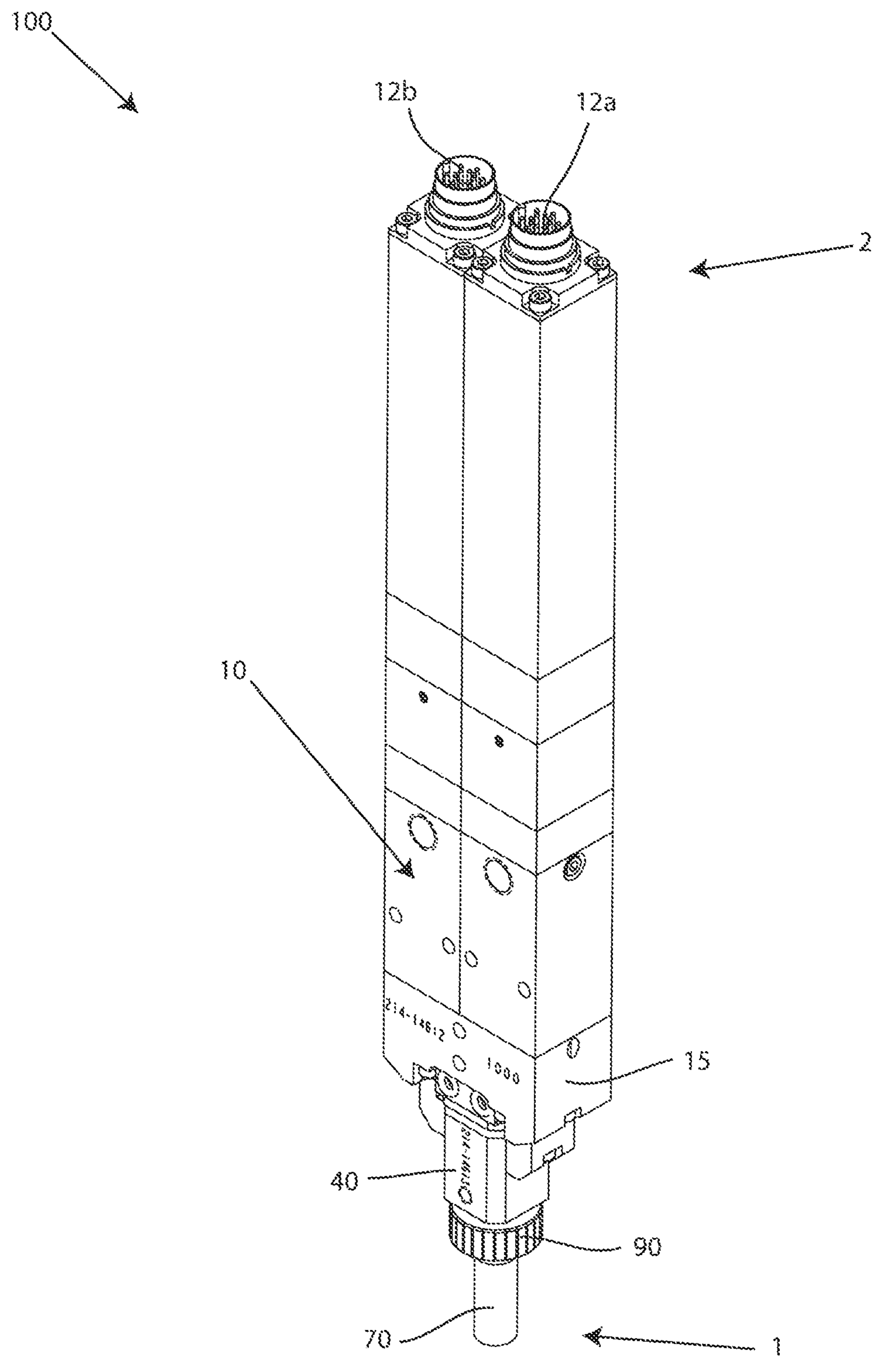
FIG. 1 depicts a perspective view of a first embodiment of a valve.
Figure 2:
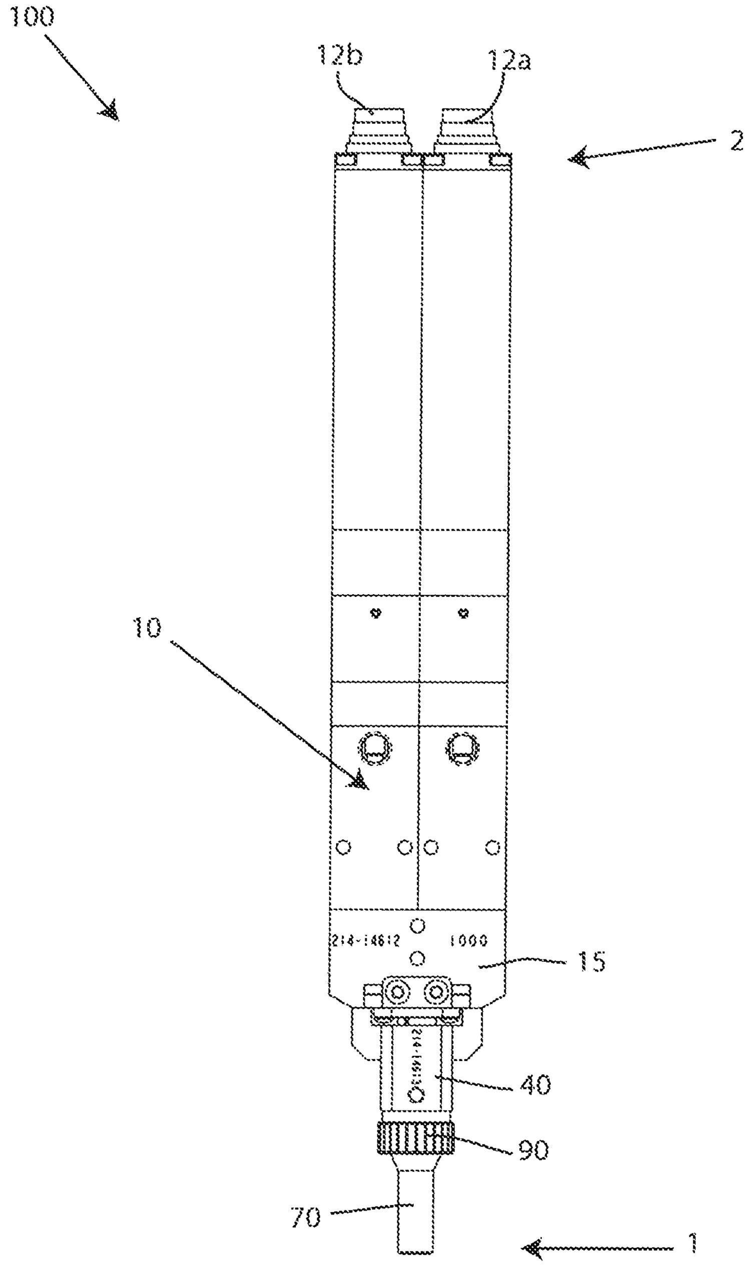
FIG. 2 depicts a front view of the first embodiment of the valve.
Figure 3:
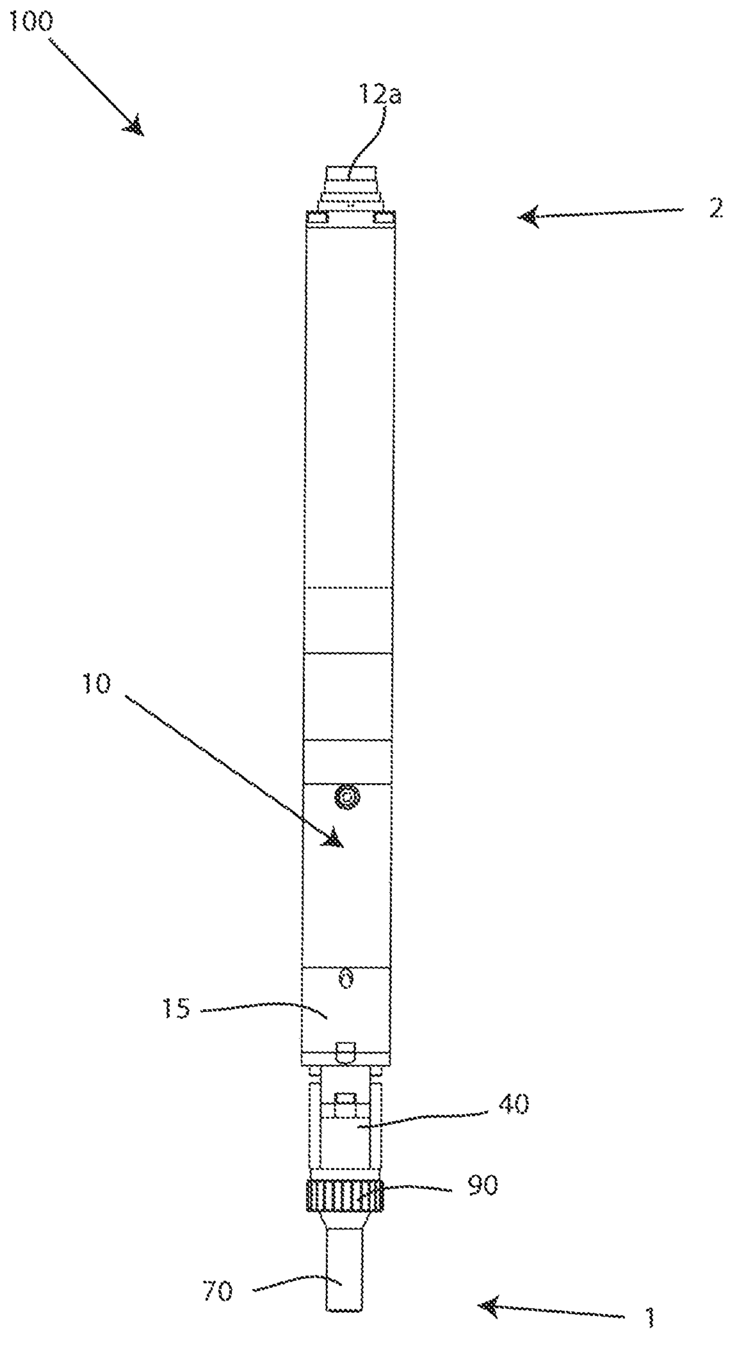
FIG. 3 depicts a side view of the first embodiment of the valve.
Figure 4:
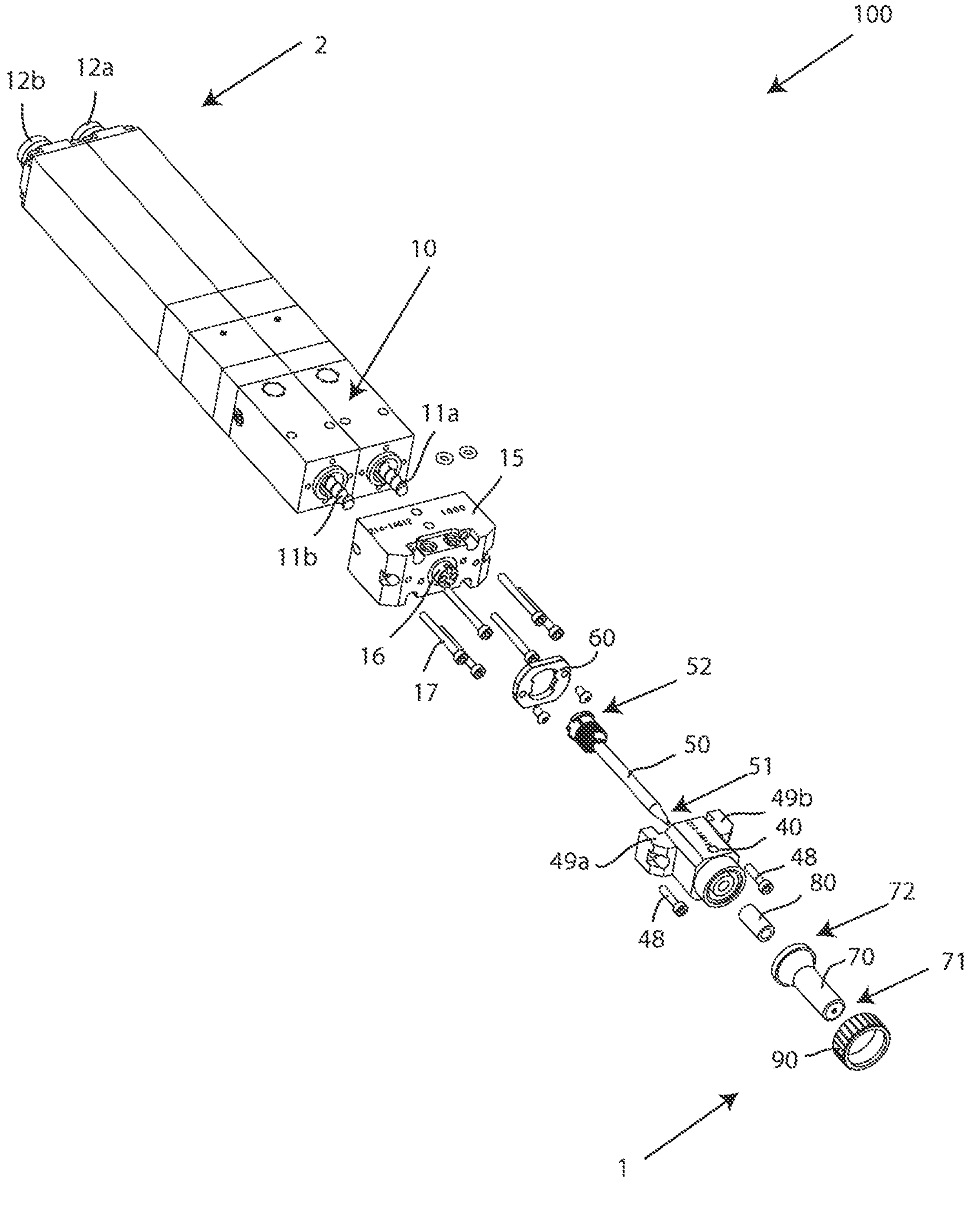
FIG. 4 depicts an assembly view of the first embodiment of the valve.

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Referring to the drawings, FIG. 1-5 depict an embodiment of a valve 100. Embodiments of valve 100 may be operably attached to an end effector. The end effector may be configured to be located within a machine or system having a frame, an X-axis actuator, a Y-axis actuator, and a Z-axis actuator. The machine housing or other component element (s) receiving the end effector may utilize a robotic platform to perform automated tasks with accuracy, precision, and repeatability. For example, the machine may be a Gantry robot having a plurality of principal axes (Cartesian coordinates) controlling linear motion, wherein the horizontal member(s) may be supported at both ends. The machine may also be any robotic manipulator such as a selective compliant assembly robot arm (SCARA) system, linear robot, multi-axis robot arm system, and the like. However, an embodiment of the machine will be described as utilizing a Gantry robot for exemplary purposes. The end effector may refer to any device(s) attached to a X, Y, Z or other axis of movement to perform a variety of tasks, such as dispensing, picking and placing, routing, and the like. For instance, an end effector is capable of rotation about the Z axis, and may move left and right along the Y axis by sliding along the Y axis actuator, and move back and forth along the X axis by sliding with the Y axis actuator as it slides along the X axis actuator. Additionally, the end effector may move up and down on the Z-axis by sliding along the Z-axis actuator. The X-axis actuator, the Y-axis actuator, and the Z-axis actuator may be a ball screw slide, linear motion slide, a linear actuator, and the like. Moreover, the frame of the machine enclosing, housing, or otherwise receiving the end effector (and potentially other end effectors) may provide a structure surrounding the components of the machine. The frame may allow for panels to be attached providing an enclosure for the machine. The panels attached to the frame may be a combination of both solid panels and see-through panels, such as Plexiglas®, glass, plastic, and the like, to allow operational viewing.

Embodiments of the valve 100 may be a device, an apparatus, valve, mixing valve, two-part spray head, dual-component spray valve, or system that is configured to deliver a fluid on a surface, edge, and/or perimeter of a substrate. Embodiments of the fluid delivered by the valve 100 may be a reactive material(s), mixed reactive product, such as a two-part reactive product having a short pot life, such as a pot life less than 5 minutes. The fluid may be formed by mixing/reacting at least two of a thermoplastic adhesive, a component adhesive, a reactive adhesive, a mixed adhesive, or an optically clear adhesive, a reactive product, or a substance having a short pot life, such as a pot life less than 5 minutes (a pot life longer than 5 minutes may also be used). The fluid may be pumped, fed, delivered, or otherwise advanced towards a nozzle for delivering onto a target separately and then mixed/reacted prior to exiting an outlet of the valve 100. Embodiments of valve 100 may include progressive pumps with an integrated spray cap for selective application of reactive materials. For instance, embodiments of the valve 100 may selectively coat a circuit board (e.g. coat some areas of the circuit board and not others) by spraying a reactive material, mixed by a mixing element, onto the target substrate, wherein the reactive material is atomized prior to exiting the nozzle. An integrated air cap allows for a control of the atomized reactant material for selective applications.

Moreover, embodiments of the valve 100 may include a feeding mechanism 10, a mixing element 50, and an air cap 70, wherein reacted components may be sprayed onto a substrate in a controllable manner.

Embodiments of two or more fluids may first be fed into a mixing element 50 by a feeding mechanism 10. Embodiments of the feeding mechanism 10 may be a fluid delivery system, a metering device, a pump system, and the like. The feeding mechanism 10 may be any mechanism that can deliver two or more fluids to an outlet. Embodiments of the feeding mechanism 10 may be operably connected to an outlet of valve 100. In one embodiment, as shown in FIGS. 1-5, the feeding mechanism 10 may be directly connected to an outlet of the valve 100 via one or more structural components connected thereto. In other embodiments, such as shown in FIG. 6, the feeding mechanism 10 may be remotely connected to the outlet of the valve 100. For instance, the feeding mechanism 10 may be operably connected via one or more lines that deliver the fluid to one or more components proximate the outlet of the valve 100. This may allow for flexibility of the valve 100, such as tilting, rotation, and other movement.

Moreover, embodiments of the feed mechanism 10 may deliver two or more fluids through operation of one or more pumps 11*a*, 11*b* of a valve 100. Embodiments of the pumps may include one or more progressive cavity pumps 11*a*, 11*b*, which may combine to form a two-part valve head. For example, embodiments of the feeding mechanism 10 may include one or more pumps 11*a*, 11*b*, and an electrical port 12*a*, 12*b* associated with the pumps 11*a*, 11*b*, respectively. In one embodiment, the pumps 11*a*, 11*b* may be in a side-by-side or parallel arrangement. In another embodiment, the pumps 11*a*, 11*b* may be in a V-shaped arrangement. The pumps 11*a*, 11*b* may be a volumetric pump utilizing a progressive cavity principle, incorporating a machined auger-like rotor. Alternatively, the pumps may be a gear pump, a piston pump, or other metering device.

In embodiments where the feed mechanism 10 is not remotely attached, embodiments of the feeding mechanism 10 may include a fluid body 15, wherein the fluid body 15 may be operably attached to the feeding mechanism 10 (e.g. via a plurality of fasteners 17). The fluid body 15 may be configured to operably receive a second end 52 of a mixing element 50. Embodiments of the fluid body 15 may be referred to as a manifold. Embodiments of the fluid body 15 of the feeding mechanism 10 may include a first fluid path 15*a* and a second fluid path 15*b* for receiving and accommodating a first and second fluid, which flows from the pumps 11*a*, 11*b* to the mixing element 50. Embodiments of the first and second fluid path 15*a*, 15*b* may be a bore or similar opening in the fluid body 15 that, at one end is in fluid communication with a fluid source for receiving a fluid, such as an adhesive, and at the other end is in fluid communication with the mixing element 50. In other words, one or more fluids may be drawn, forced, or otherwise fed from a fluid source (e.g. via tube or hose connection to the source) through the first and/or second fluid path 15*a*, 15*b* to the second end 52 of the mixing element 50 through operation of one or more pump, such as pumps 11*a*, 11*b*. Further, embodiments of the fluid body 15 may include a connector 16. The connector 16 may mate with the mixing element 50. The connector 16 may include two outlets for the pumped fluids, which can be combined in the mixer 50. The components of the valve head 100 may be comprised of metal, plastic, composite, or a combination thereof.

Figure 5:
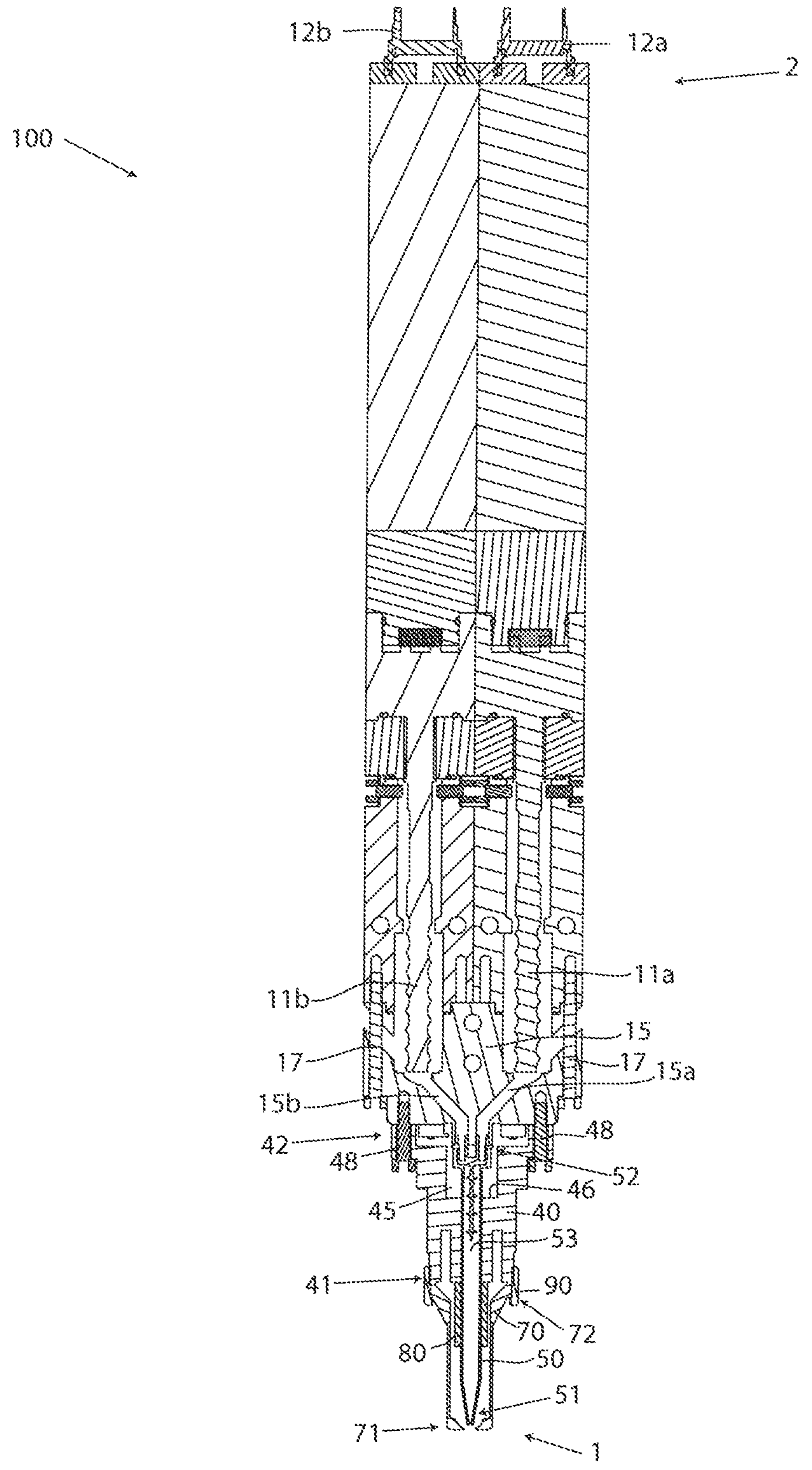
FIG. 5 depicts a cross-sectional view of the first embodiment of the valve.
Figure 6:
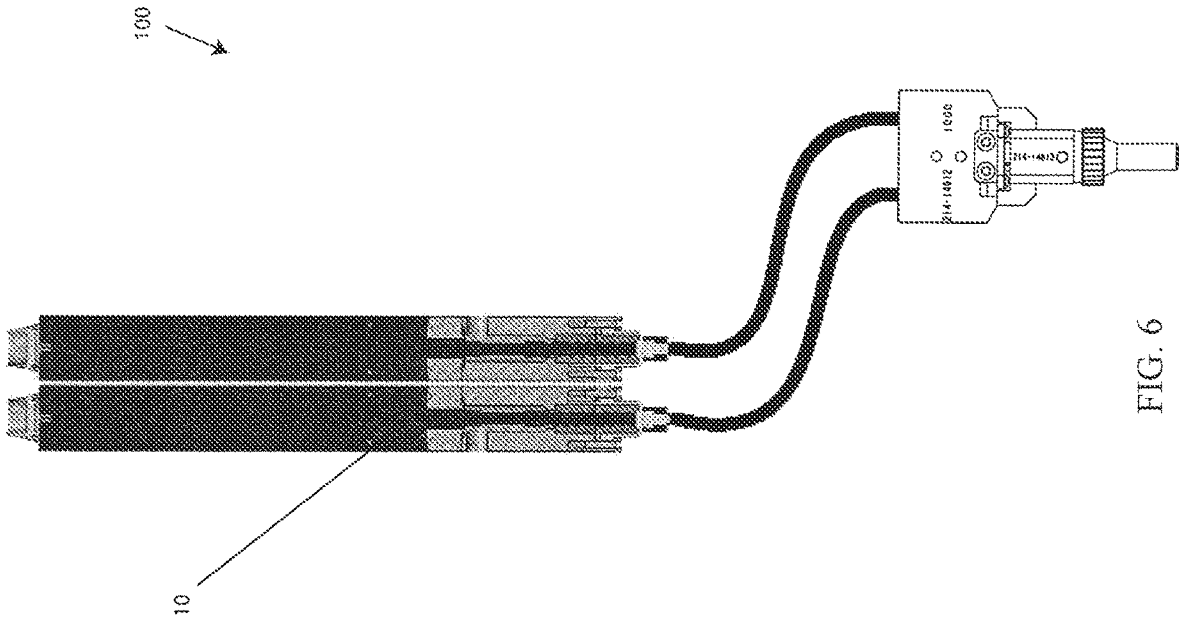
FIG. 6 depicts a front view of the first embodiment of the valve having a remotely connected feed mechanism.

Referring still to FIGS. 1-5, embodiments of valve 100 may further include a mixing element 50. Embodiments of the mixing element 50 may be operably connected to the feeding mechanism as shown in FIG. 5. In other words, the mixing element 50 may be located or otherwise disposed between the fluid body 15 of the feeding mechanism 10 and the spray tip 70. Embodiments of the mixing element 50 may have a first end 51, a second end 52, and an internal pathway 53 therebetween. Embodiments of the mixing element 50 may be a vessel or tube that is configured to receive one or more types of fluids, such as two reactive adhesives at a second end 52 from the feeding mechanism 10. For example, a first fluid may enter the mixing element 50 from the first fluid path 15*a* and a second fluid may enter the mixing element 50 from the second fluid path 15*b* for mixing and/or reaction with one another. The first fluid and the second fluid entering the mixing element 50 from the feeding mechanism 10 may be different fluids, similar fluids, the same fluids, and combination of fluids entering the mixing element 50 for further reaction and mixing. Embodiments of the mixing element 50 may be a static or dynamic mixer, and may be rigid or flexible. Once within the mixing element 50, the reactive adhesives may mix or otherwise react with each other and travel through the internal pathway 53 of the mixing element 50. The adhesives contained within the mixing element 50 may then exit the mixing element 50 through an opening at the first end 51, wherein the mixed fluid is atomized and delivered to a substrate with precision and accuracy, as described in greater detail infra.

Embodiments of valve 100 may further include a spray body 40. Embodiments of spray body 40 may include an axial opening 45 therethrough, which may receive the mixing element 50, and also potentially a spacer 80. The axial opening 45 of the spray body 40 may extend from a first end 41 to a second end 42, such that the opening 45 extends entirely through the spray body 40. Further, embodiments of opening 45 of the spray body 40 may have a reduced diameter starting from an internal lip 46 and extending to the first end 41 of the spray body 40. The spray body 40 may be operably attached to the fluid body 15 of the valve 100 via one or more fasteners 48. The fasteners 48 may pass through openings on one more flanges 49*a*, 49*b* of the spray body 40. Moreover, embodiments of the spray body 40 may have external threads proximate the first end 41 for mating with a collar 90. Embodiments of the collar 90, or retaining ring, may secure engagement between the spray body 40 and the air cap 70.

Additionally, embodiments of the valve 100 may further include an attachment plate 60. Embodiments of the attachment plate 60 may be configured to securably removable attach the mixing element 50 to the valve 100. For instance, embodiments of the attachment plate 60 may be fastened to a bottom surface of the fluid body 15 at one side of the attachment plate 60. The other side of the attachment plate 60 may face the outlet end 1 of the valve 100. The attachment plate 60, being fastened to the fluid body 15, may receive the second end 52 of the mixing element 50 for removable attachment thereto. An irregular shaped opening of the attachment plate 60 matingly corresponds to structure on the second end 52 of the mixing element 50, wherein the attachment plate 60 may function as a collar for the mixing element 50. Thus, the mixing element 50 may be removably attached to the attachment plate 60 and the connector 16 of the fluid body 15.

Embodiments of the valve 100 may also include a spacer 80. Embodiments of the spacer 80 may be a cylindrical member having an axial opening therethrough. The spacer 80 may be disposed around the mixing element 50, wherein a portion of the tube of the mixing element 50 is received within the axial opening of the spacer 80. Embodiments of the spacer 80 may be disposed within an interior of the air cap 70. Further, embodiments of the spacer 80 may stabilize a portion of the mixing element 50 disposed within the air cap 70.

Figure 7:
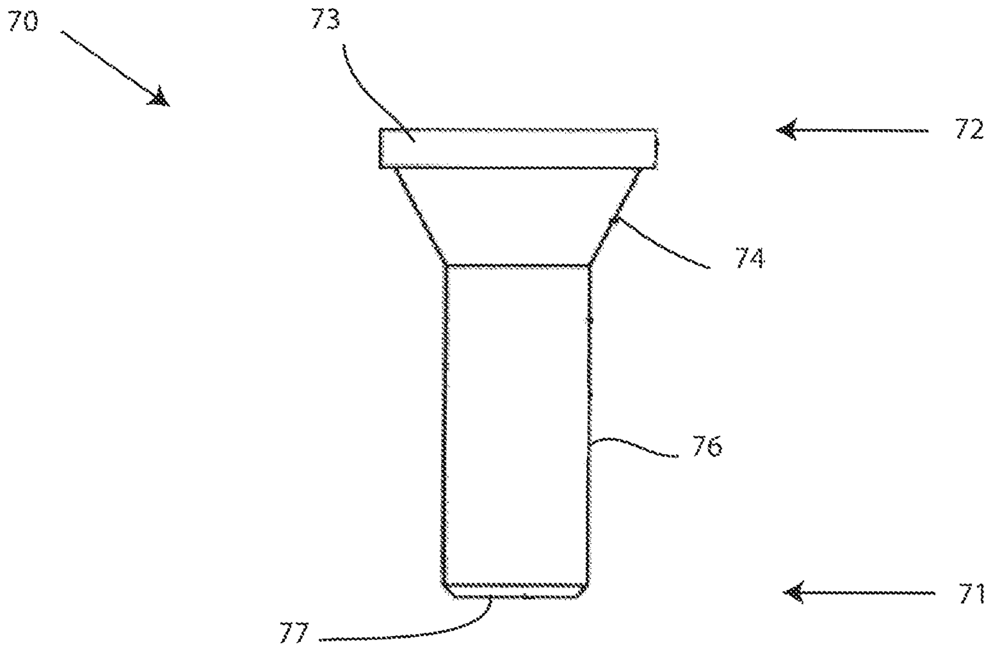
FIG. 7 depicts a front view of an embodiment of an air cap.
Figure 8:
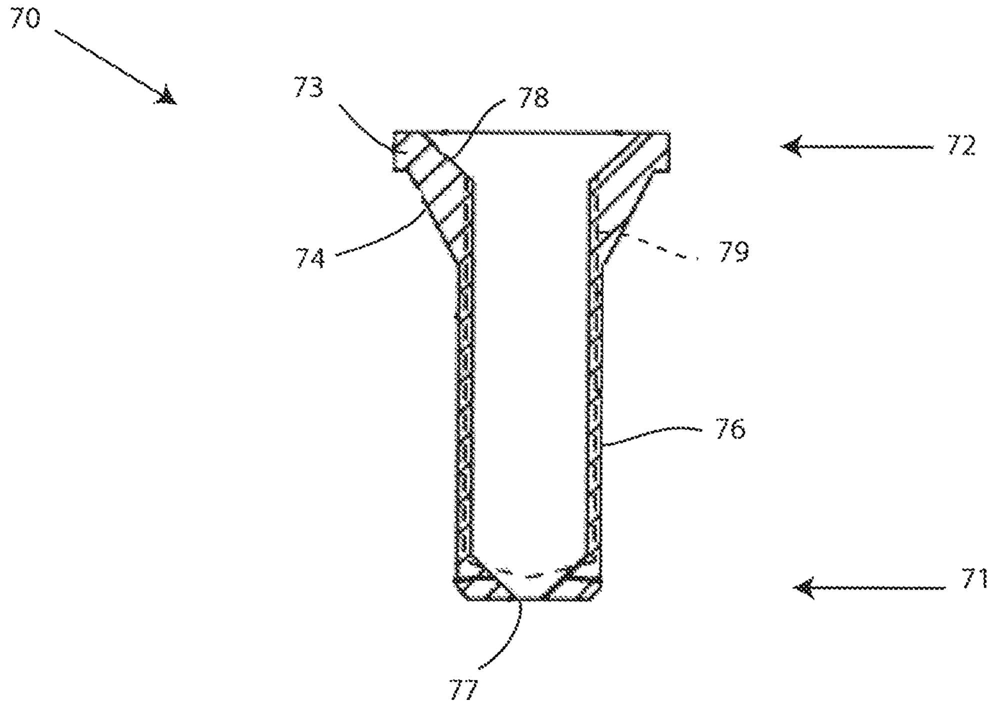
FIG. 8 depicts a cross-sectional view of the embodiment of the air cap.

With continued reference to FIGS. 1-5, and additional reference to FIGS. 7-8, embodiments of the valve 100 may also include an air cap 70. Embodiments of air cap 70 may be a spray tip, an atomizer, an atomizing tip, an air tip, and the like. Embodiments of the air cap 70 may include a first end 71 and a second end 72, a collar 73, a tapered inlet 74, a vertical extension 76, and a lower opening 77. Embodiments of the collar 73 may include external threads to threadably engage threads of the collar 90. Thus, to remove the air cap 70, a user may unthread the collar 90, which allows for easy access to the mixing element 50 for disposal and replacement. The lower opening 77 in the atomizing air cap 70 is where the fluid material leaves the atomizing air cap 70 in an atomized state and is directed toward a substrate surface. FIG. 8 is a cross-sectional side view of the atomizing air cap 70 of FIG. 7. A converging inlet surface 78 may be included in the tapered inlet 74. The converging inlet surface 78 may gather compressed air entering the atomizing air cap 70 from air passages located in the spray body 40. The air cap 70 may include a fluted inner surface 79 for generating laminar jets of compressed air.

Compressed air or a gas may be introduced into the valve 100 via one or more inlet ports on the spray body 40. The compressed air or gas flows through the air cap 70 to atomize the fluid exiting the mixing element 50. For example, the compressed air may travel in a laminar flow through the air cap and when exiting, may act upon the fluid exiting the mixing element 50 to atomize the fluid, yet keeping a defined round (or corresponding shape of the air cap 70) spray pattern to impinge on and/or coat a substrate. The interior geometry and structure of the air cap 70 in combination with the compressed air or gas provides a clean spray pattern for selective coating applications. For example, the spray pattern may be a fine, circular pattern with widths ranging from 0.125" to 0.5".

In some embodiments, the mixing element 50 may be disposable while the air cap 70 is reusable. A reusable air cap 70 may be comprised of metal, such as stainless steel. In other embodiments, the mixing element 50 may be disposable and the air cap 70 may also be disposable. A disposable air cap 70 may be comprised of a low-cost material, such as plastics, composites, aluminum, and the like. The air cap 70 may be manufactured in a variety of methods known to those skilled in the art, including 3D printing methods.

Referring still to the drawings, FIGS. 9-19 depict an embodiment of valve 200. Embodiments of valve 200 may include the same or substantially the same structural or functional aspects of valve 100. Embodiments of valve 200 may include an alternative connection mechanism for operably securing an atomizing tip to a mixing valve.

Figure 9:
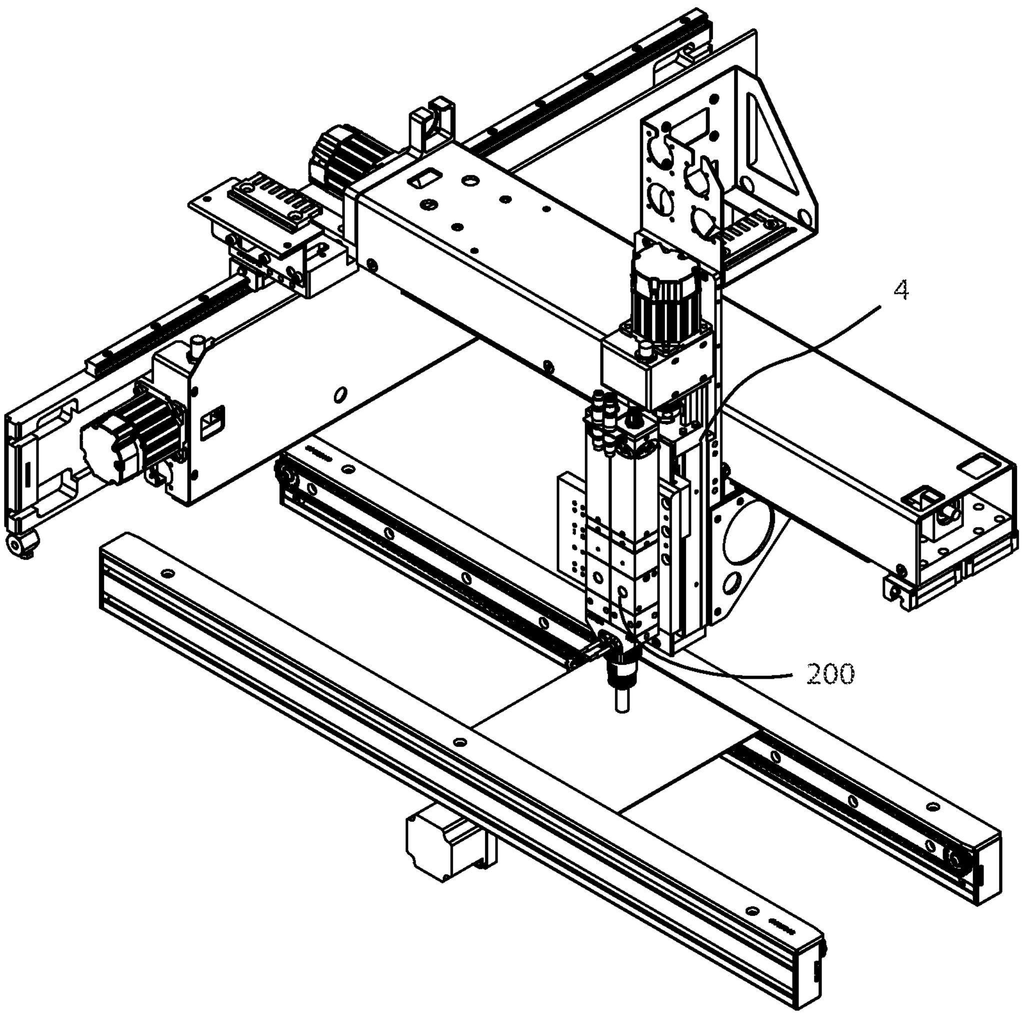
FIG. 9 depicts an embodiment of a machine having a valve.
Figure 10:
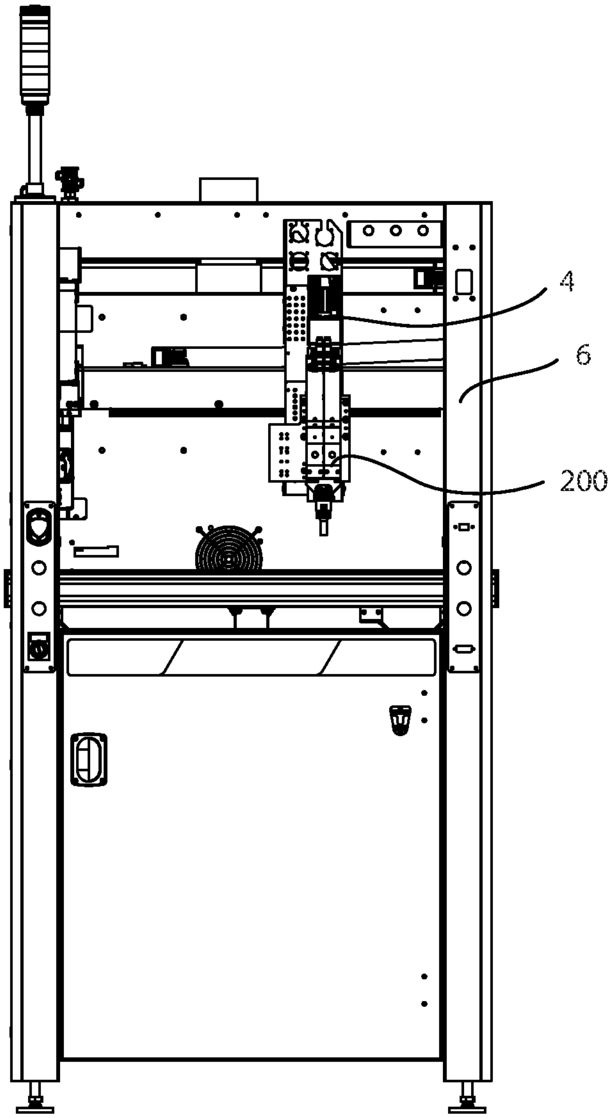
FIG. 10 depicts an embodiment of a valve attached to an end effector.
Figure 11:
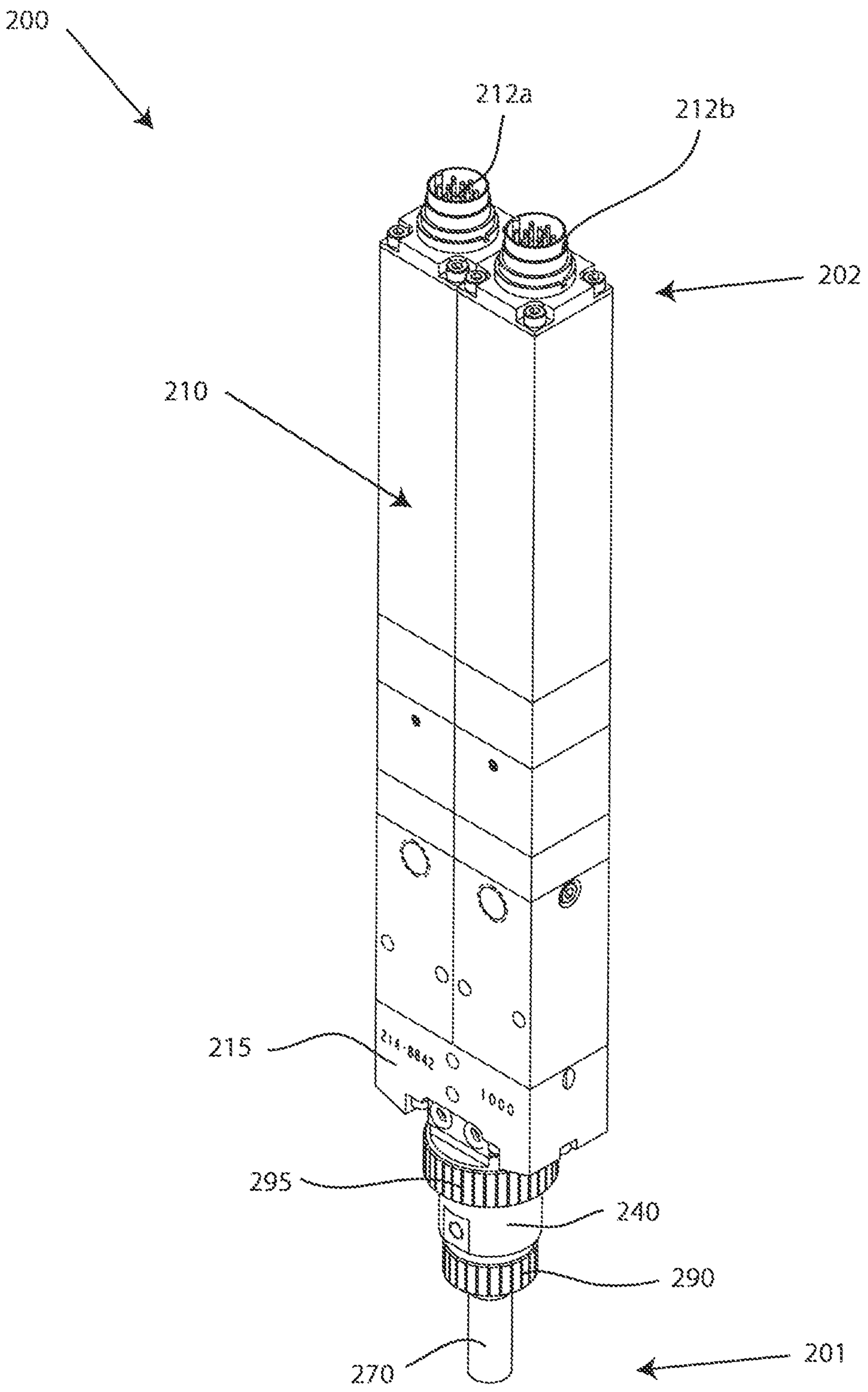
FIG. 11 depicts a perspective view of a second embodiment of a valve.

Specifically, embodiments of valve 200 may be operably attached to an end effector 4. The end effector 4 may be configured to be located within a machine 6 or system having a frame, an X-axis actuator, a Y-axis actuator, and a Z-axis actuator, as shown in FIGS. 9-10. The machine housing 6 or other component element(s) receiving the end effector 4 may utilize a robotic platform to perform automated tasks with accuracy, precision, and repeatability. For example, the machine may be a Gantry robot having three principal axes (Cartesian coordinates) controlling linear motion, wherein the horizontal member(s) may be supported at both ends. The machine 6 may also be any robotic manipulator such as a selective compliant assembly robot arm (SCARA) system, linear robot, multi-axis robot arm system, and the like. However, an embodiment of the machine 6 will be described as utilizing a Gantry robot for exemplary purposes. The end effector 4 may refer to any device(s) attached to a X, Y, Z or other axis of movement to perform a variety of tasks, such as dispensing, picking and placing, routing, and the like. For instance, an end effector is capable of rotation about the Z axis, and may move left and right along the Y axis by sliding along the Y axis actuator, and move back and forth along the X axis by sliding with the Y axis actuator as it slides along the X axis actuator. Additionally, the end effector 4 may move up and down on the Z-axis by sliding along the Z-axis actuator. The X-axis actuator, the Y-axis actuator, and the Z-axis actuator may be a ball screw slide, linear motion slide, a linear actuator, and the like. Moreover, the frame of the machine 6 enclosing, housing, or otherwise receiving the end effector 4 (and potentially other end effectors) may provide a structure surrounding the components of the machine 6. The frame may allow for panels to be attached providing an enclosure for the machine. The panels attached to the frame may be a combination of both solid panels and see-through panels, such as Plexiglas®, glass, plastic, and the like, to allow operational viewing.

Embodiments of the valve 200 may be a device, an apparatus, a valve, a mixing valve, or system that is configured to dispense a fluid on a surface, edge, and/or perimeter of a substrate for operable coating of one or more surfaces or substrates, such as a circuit board, flex circuit, and the like. Embodiments of the fluid delivered by the valve 200 may be a reactant material(s), mixed reactive product, such as a two-part reactive product an adhesive, having a short pot life, such as a pot life less than 5 minutes. The fluid may be formed by mixing/reacting at least two of a thermoplastic adhesive, a component adhesive, a reactive adhesive, a mixed adhesive, or an optically clear adhesive, a reactive product, or a substance having a short pot life, such as a pot life less than 5 minutes (a pot life longer than 5 minutes may also be used). The fluid may be pumped, fed, delivered, or otherwise advanced towards a nozzle for delivering onto a target separately and then mixed/reacted prior to exiting the valve 200. Embodiments of valve 200 may include progressive pumps with an integrated spray cap for selective application of reactive materials. For instance, embodiments of the valve 200 may selectively coat a circuit board (e.g. coat some areas of the circuit board and not others) by spraying a reactive material, mixed by a mixing element, onto the target substrate, wherein the reactive material is atomized prior to exiting the nozzle. An integrated air cap allows for a control of the atomized reactant material for selective applications.

Moreover, embodiments of the valve 200 may include a feeding mechanism 210, a mixing element 250, and an air cap 270, wherein reacted adhesives may be sprayed onto a substrate in a controllable manner.

Embodiments of two or more fluids may first be fed into a mixing element 250 by a feeding mechanism 210. Embodiments of the feeding mechanism 210 may be a fluid delivery system, a metering device, a pump system, and the like. The feedings mechanism 210 may be any mechanism that can deliver two or more fluids to an outlet. Embodiments of the feeding mechanism 210 may be operably connected to an outlet of valve 100. In some embodiments, as shown in FIGS. 9-17, the feeding mechanism 210 may be directly connected to an outlet of the valve 200 via one or more structural components connected thereto. FIGS. 11-15 depict a feeding mechanism 210 including at least two pumps, metering devices, and the like. FIG. 16-18 depict an embodiment of a feeding mechanism 210 that does not include pumps, but includes a precise on/off control of the flow of the fluids delivered to the mixing element. For instance, the embodiments of the feed mechanism 210 shown in FIGS. 16-18 may include a pneumatic on/off flow control means including an inlet 213 for air or other gas to be introduced for closing flow of fluid, an inlet 214 for introducing air or other gas for opening a flow of fluid, a first fluid path 215*a*, and a second fluid path 215*b*. In other embodiments, such as shown in FIG. 19, the feeding mechanism 210 may be remotely connected to the outlet of the valve 200. For instance, the feeding mechanism 210 may be operably connected via one or more lines that deliver the fluid to one or more components proximate the outlet of the valve 200. This may allow for flexibility of the valve 200, such as tilting and other movement.

Moreover, embodiments of the feed mechanism 210 may deliver two or more fluids through operation of one or more pumps 211*a*, 211*b* of a valve 200, or other flow control means. Embodiments of the pumps may include one or more progressive cavity pumps 211*a*, 211*b*, which may combine to form a two-part valve head. For example, embodiments of the feeding mechanism 210 may include one or more pumps 211*a*, 211*b*, and an electrical port 212*a*, 212*b* associated with the pumps 211*a*, 211*b*, respectively. In one embodiment, the pumps 211*a*, 211*b* may be in a side-by-side or parallel arrangement. In another embodiment, the pumps 211*a*, 211*b* may be in a V-shaped arrangement. The pumps 211*a*, 211*b* may be a volumetric pump utilizing a progressive cavity principle, incorporating a machined auger-like rotor. Alternatively, the pumps may be a gear pump, a piston pump, or other metering device.

Moreover, in embodiments where the feed mechanism 210 is not remotely attached, embodiments of the feeding mechanism 210 may include a fluid body 215, wherein the fluid body 215 may be operably attached to the feeding mechanism 210 (e.g. via a plurality of fasteners 217). The fluid body 215 may be configured to operably receive a second end 252 of a mixing element 250. Embodiments of the fluid body 215 may be referred to as a manifold. Embodiments of the fluid body 215 of the feeding mechanism 210 may include a first fluid path 215*a* and a second fluid path 215*b* for receiving and accommodating a first and second fluid, which flows from the pumps 211*a*, 211*b* to the mixing element 250. Embodiments of the first and second fluid path 215*a*, 215*b* may be a bore or similar opening in the fluid body 215 that, at one end is in fluid communication with a fluid source for receiving a fluid, such as an adhesive, and at the other end is in fluid communication with the mixing element 250. In other words, one or more fluids may be drawn, forced, or otherwise fed from a fluid source (e.g. via tube or hose connection to the source) through the first and/or second fluid path 215*a*, 215*b* to the second end 252 of the mixing element 250 through operation of one or more pump, such as pumps 211*a*, 211*b*. Further, embodiments of the fluid body 215 may include a connector 216. The connector 216 may mate with the mixing element 250. The connector 216 may include two outlets for the pumped fluids, which can be combined in the mixer 250. The components of the valve head 200 may be comprised of metal, plastic, composite, or a combination thereof.

Figure 15:
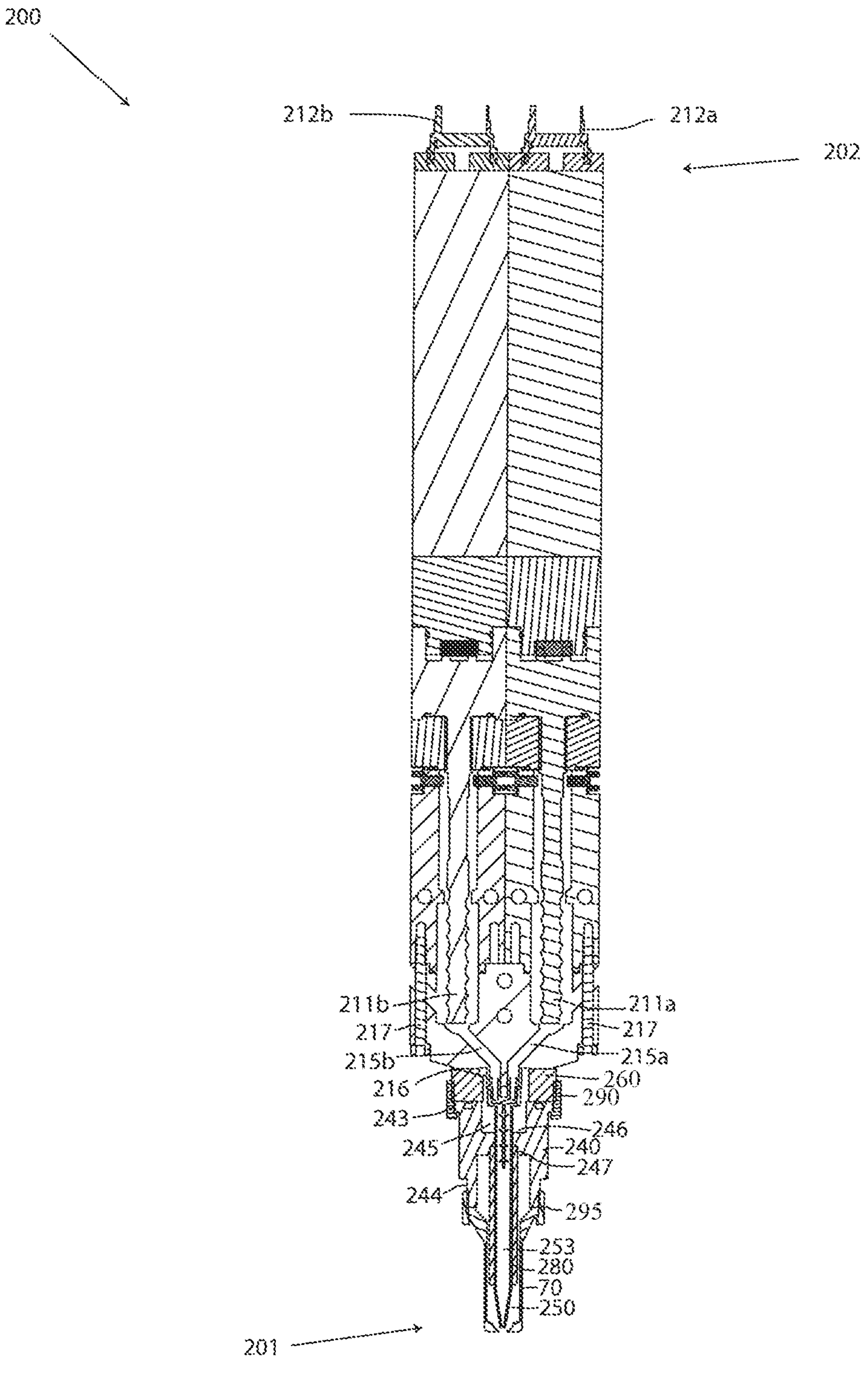
FIG. 15 depicts a cross-sectional view of the second embodiment of the valve.
Figure 16:
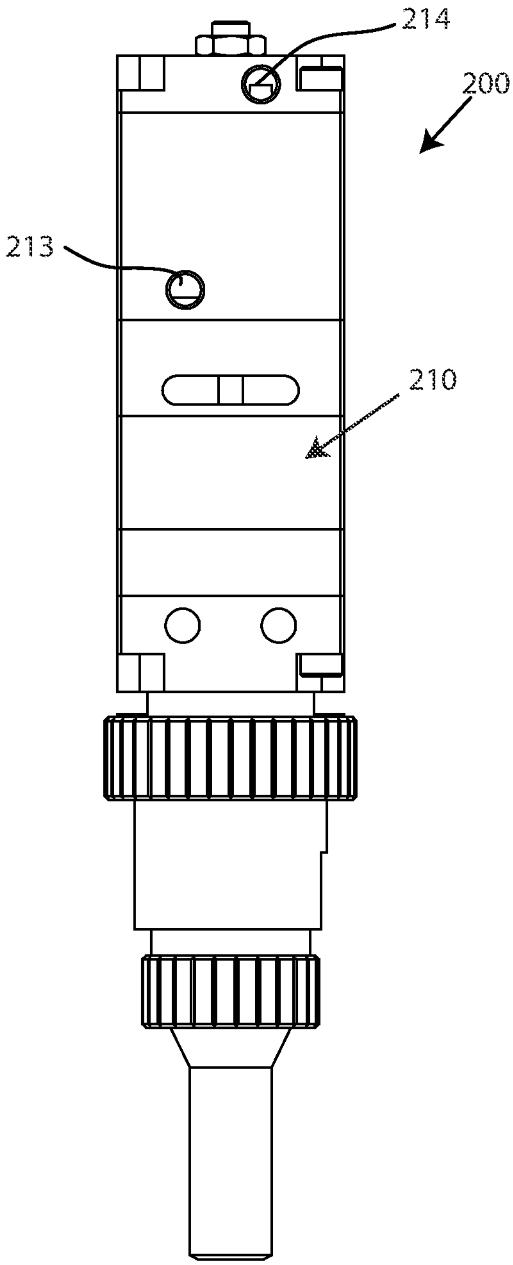
FIG. 16 depicts a front view of an alternative embodiment of a feed mechanism.
Figure 17:
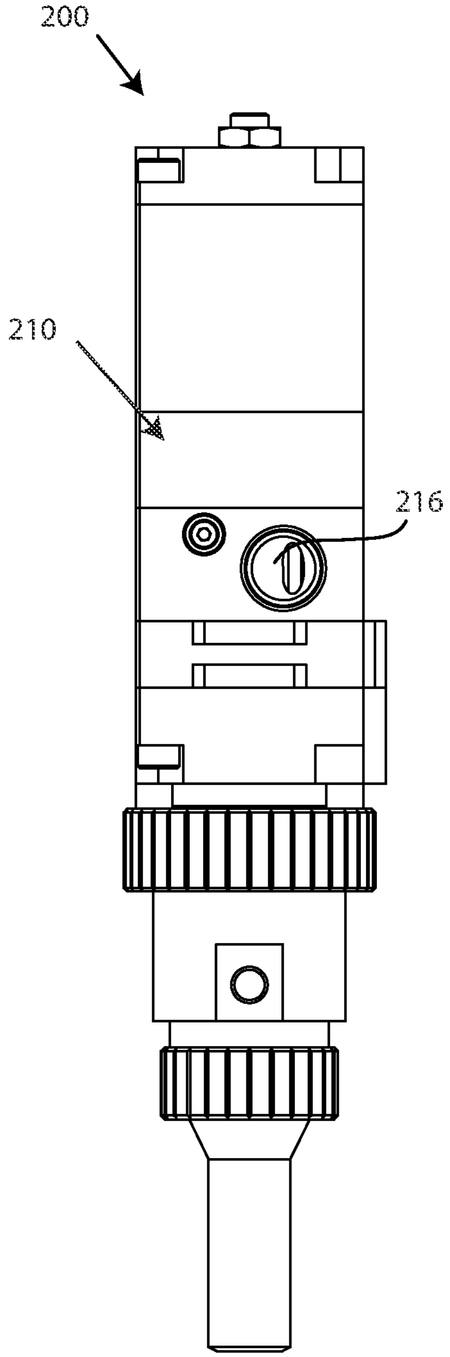
FIG. 17 depicts a side view of an alternative embodiment of the feed mechanism.
Figure 18:
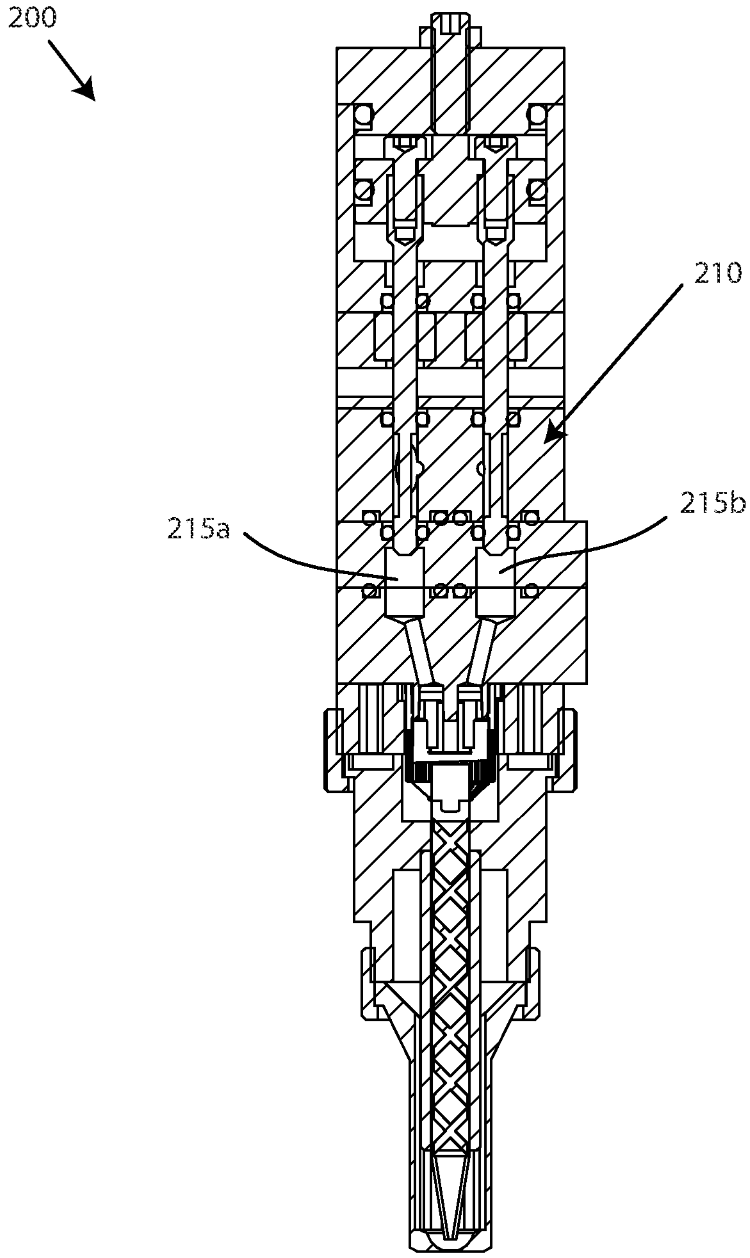
FIG. 18 depicts a cross-sectional view of an alternative embodiment of the feed mechanism.
Figure 19:
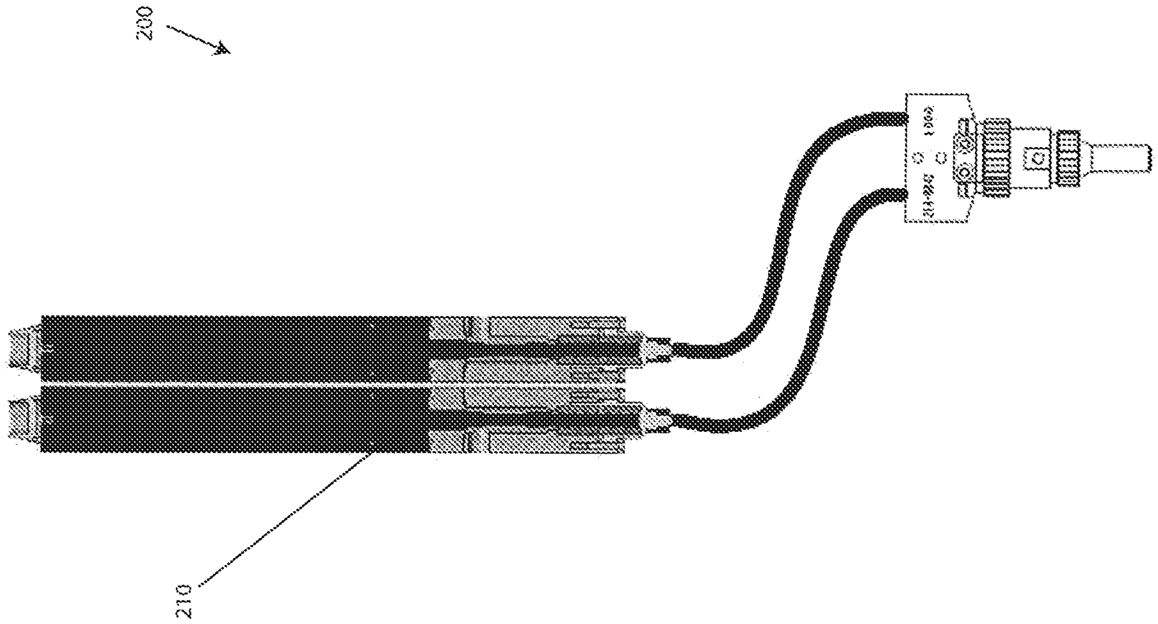
FIG. 19 depicts a front view of the second embodiment of the valve having a remotely connected feed mechanism.

Referring still to FIGS. 9-19, embodiments of valve 200 may further include a mixing element 250. Embodiments of the mixing element 250 may be operably connected to the feeding mechanism as shown in FIG. 15. In other words, the mixing element 250 may located or otherwise disposed between the fluid body 215 of the feeding mechanism 210 and the spray tip 270. Embodiments of the mixing element 250 may have a first end 251, a second end 252, and an internal pathway 253 therebetween. Embodiments of the mixing element 250 may be a vessel or tube that is configured to receive one or more types of fluids, such as two reactive adhesives at a second end 252 from the feeding mechanism 210. For example, a first fluid may enter the mixing element 250 from the first fluid path **215*a* and a second fluid may enter the mixing element 250 from the second fluid path 215*b* for mixing and/or reaction with one another. The first fluid and the second fluid entering the mixing element 250 from the feeding mechanism 210 may be different fluids, similar fluids, the same fluids, and combination of fluids entering the mixing element 250 for further reaction and mixing. Embodiments of the mixing element 250 may be a static or dynamic mixer, and may be rigid or flexible. Once within the mixing element 250, the reactive adhesives may mix or otherwise react with each other and travel through the internal pathway 253 of the mixing element 250. The adhesives contained within the mixing element 250 may then exit the mixing element 250 through an opening at the first end 251**, wherein the mixed fluid is atomized and delivered to a substrate with precision and accuracy, as described in greater detail infra.

Embodiments of the valve 200 may include an attachment component 260. Embodiments of the attachment component 260 may be configured to securably removable attach the mixing element 250 to the valve 200. For instance, embodiments of the attachment component 260 may be fastened to a bottom surface of the fluid body 215 at one side of the attachment component 260 via one or more fasteners 264. The other side of the attachment component 260 may face the outlet end 201 of the valve 200. The attachment component 260, being fastened to the fluid body 215, may receive the second end 252 of the mixing element 250 for removable attachment thereto. An irregular shaped opening of the attachment component 60 may matingly correspond to structure on the second end 252 of the mixing element 250, wherein the attachment component 260 may function as a collar for the mixing element 250. Thus, the mixing element 250 may be removably attached to the attachment component 260 and the connector 216 of the fluid body 215. An exterior surface of the attachment component 260, or a portion thereof, may include external threads for threadably mating with a retaining ring 290 to secure the spray body 240 to the valve 200.

Figure 12:
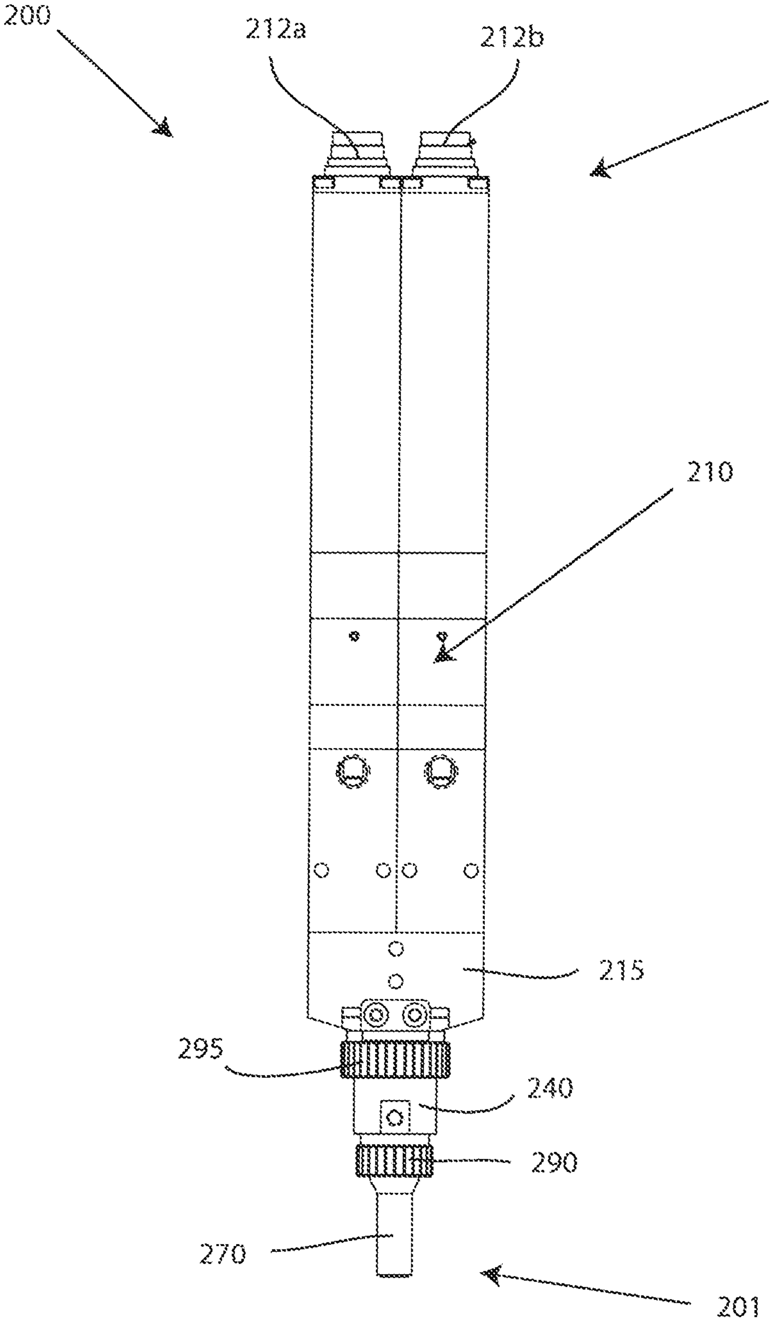
FIG. 12 depicts a front view of the second embodiment of the valve.
Figure 13:
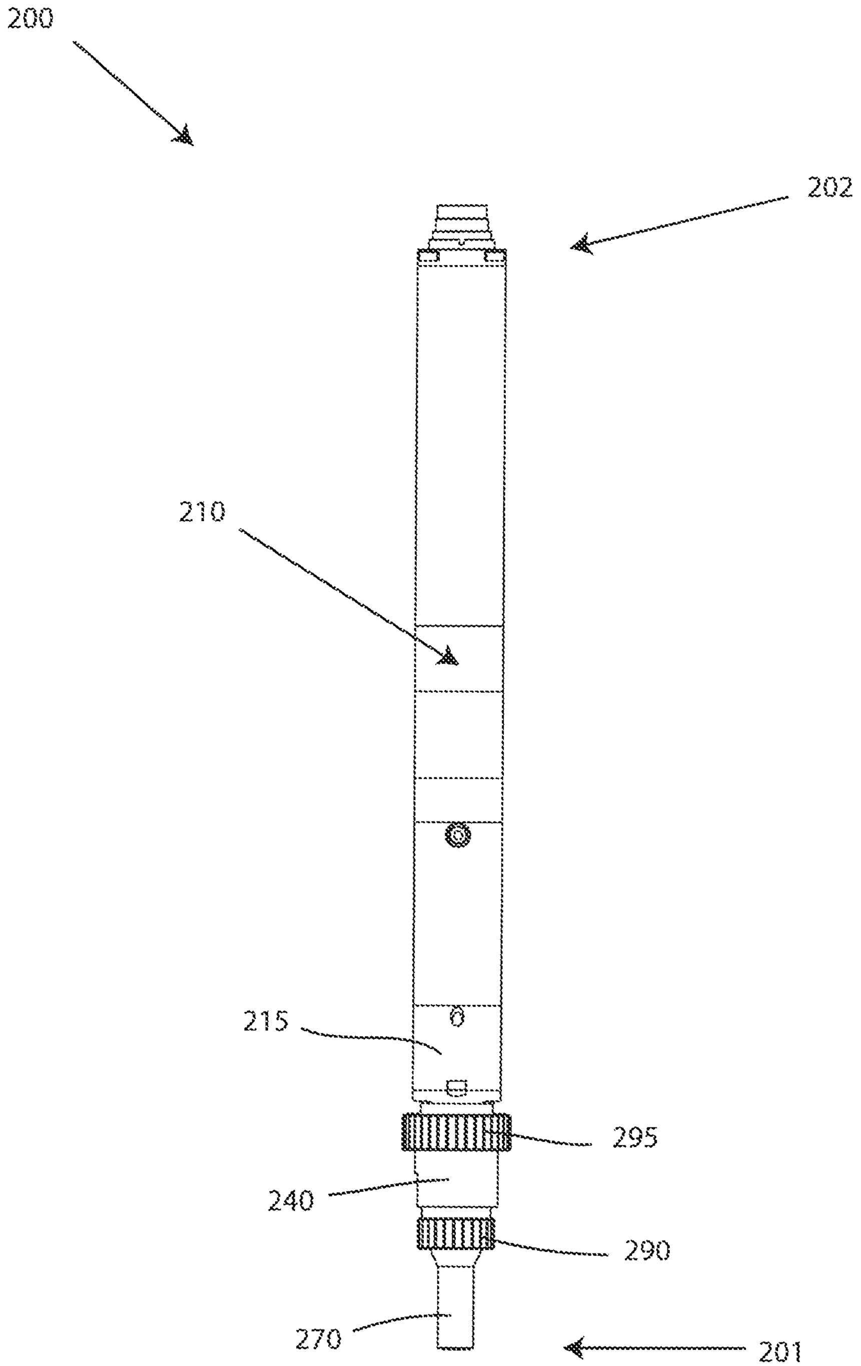
FIG. 13 depicts a side view of the second embodiment of the valve.
Figure 14:
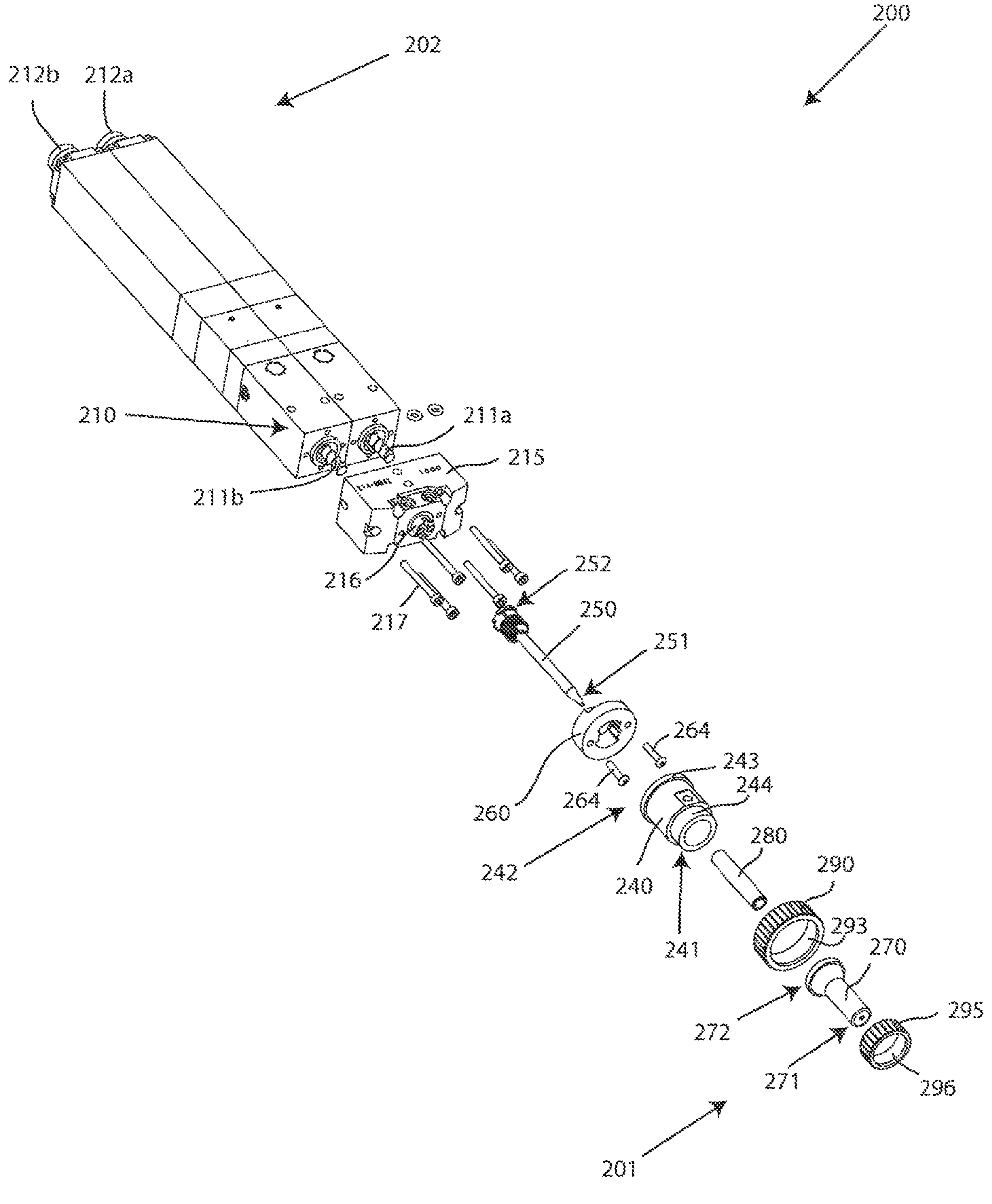
FIG. 14 depicts an assembly view of the second embodiment of the valve.

Embodiments of valve 200 may further include a spray body 240. Embodiments of spray body 240 may include an axial opening 245 therethrough, which may receive the mixing element 250, and also potentially a spacer 280. The axial opening 45 of the spray body 40 may extend from a first end 241 to a second end 242, such that the opening 245 extends entirely through the spray body 240. Further, embodiments of opening 245 of the spray body 240 may have an internal radial flange 246 that extends radial inward a distance from an interior surface of the spray body 240. The internal radial flange 246 may engage the mixing element 250 disposed within the spray body 240. Embodiments of the internal radial flange 246 may include a notch 247 on a side of the flange 246 that faces the first end 241 of the spray body 240. The notch 247 may receive an end of the spacer 280 in an assembled configuration, as shown in FIG. 12. Moreover, embodiments of the spray body 240 may include an external flange 243 proximate, or at the second end 242 of the spray body 240. The external flange 243 may include threads for threadably mating with the retaining ring 90. The first end 241 of the spray body 240 may include a recessed surface 244, wherein the recessed surface 244 or a portion thereof includes external threads for threadably mating with a collar 295 that threadably secures the air cap 270 to the valve 200.

Embodiments of the valve 200 may also include a spacer 280. Embodiments of the spacer 280 may be a cylindrical member having an axial opening therethrough. The spacer 280 may be disposed around the mixing element 250, wherein a portion of the tube of the mixing element 250 is received within the axial opening of the spacer 280. Embodiments of the spacer 280 may be disposed within an interior of the air cap 270, wherein one end of the spacer 80 may reside within notch 247 of the spray body 240 in an assembled configuration. Further, embodiments of the spacer 280 may stabilize a portion of the mixing element 250 disposed within the air cap 270.

Figure 20:
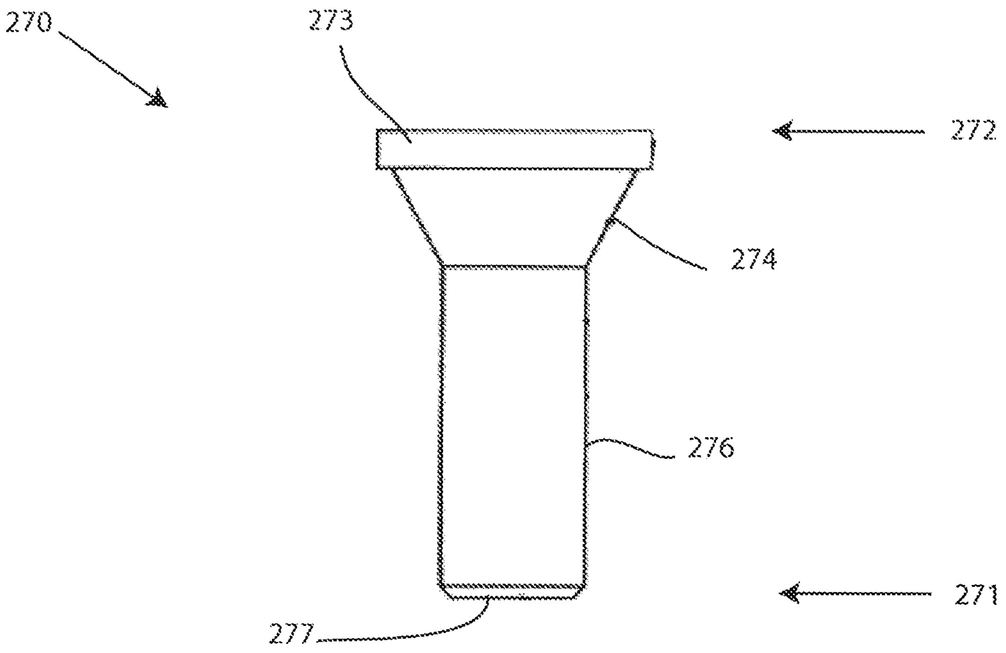
FIG. 20 depicts a front view of an embodiment of an air cap.
Figure 21:
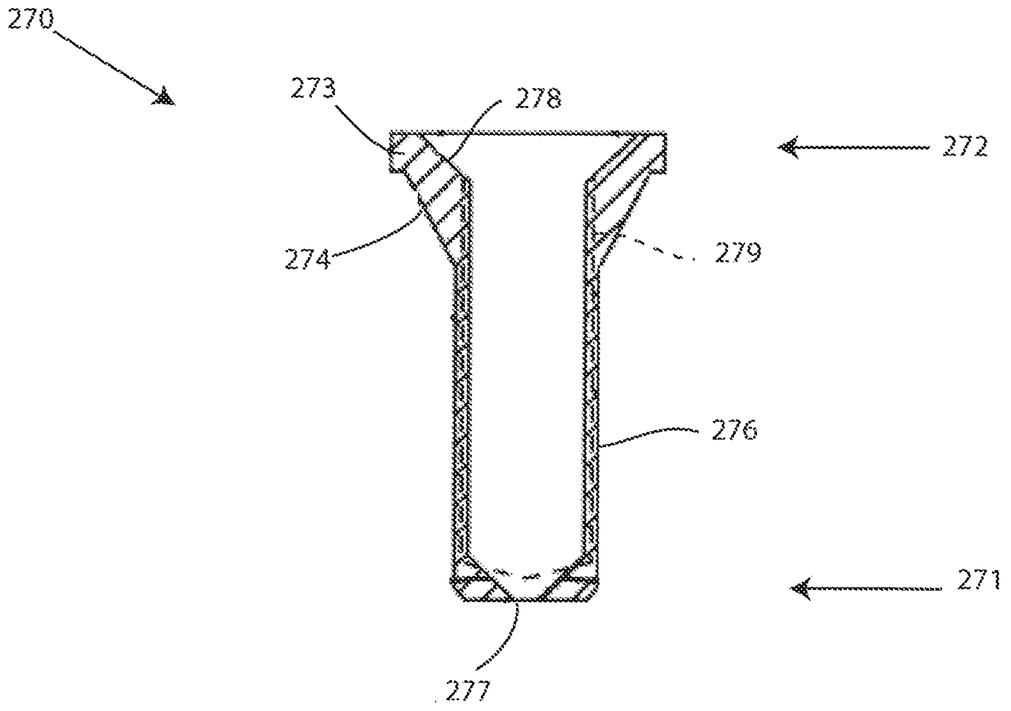
FIG. 21 depicts a cross-sectional view of the embodiment of the air cap.

With continued reference to FIGS. 9-19, and additional reference to FIGS. 20-21, embodiments of the valve 200 may also include an air cap 270. Embodiments of air cap 270 may be a spray tip, an atomizer, an atomizing tip, an air tip, and the like. Embodiments of the air cap 270 may include a first end 271 and a second end 272, a collar 273, a tapered inlet 274, a vertical extension 276, and a lower opening 277. Embodiments of the collar 273 of the spray cap 270 may include external threads to threadably engage threaded surface 296 of the collar 295. Thus, to remover the air cap 270, a user may unthread the collar 295, which provides easy access to the mixing element 250 for disposal and replacement. The additional retainer ring 290 may also be unthreaded to allow for removal of the spray body 240 for further access to the mixing element 250. The lower opening 277 in the atomizing air cap 270 is where the fluid material leaves the atomizing air cap 270 in an atomized state and is directed toward a substrate surface. FIG. 18 is a cross-sectional side view of the atomizing air cap 270 of FIG. 15. A converging inlet surface 278 may be included in the tapered inlet 274. The converging inlet surface 278 may gather compressed air or other gas entering the atomizing air cap 270 from air passages located in the spray body 240. The air cap 270 may include a fluted inner surface 279 for generating laminar jets of compressed air or other gas.

Compressed air may be introduced into the valve 200 via one or more inlet ports on the spray body 240. The compressed air flows through the air cap 270 to atomize the fluid exiting the mixing element 250. For example, the compressed air may travel in a laminar flow through the air cap and when exiting, may act upon the fluid exiting the mixing element 250 to atomize the fluid, yet keeping a defined round spray pattern to impinge on and/or coat a substrate. The interior geometry and structure of the air cap 270 in combination with the compressed air provides a clean spray pattern for selective application. For example, the spray pattern may be a fine, circular pattern with widths ranging from 0.125" to 0.5".

In some embodiments, the mixing element 50 may be disposable while the air cap 70 is reusable. A reusable air cap 70 may be comprised of metal, such as stainless steel. In other embodiments, the mixing element 50 may be disposable and the air cap 70 may also be disposable. A disposable air cap 70 may be comprised of a low-cost material, such as plastics, composites, aluminum, and the like. The air cap 70 may be manufactured in a variety of methods known to those skilled in the art, including 3D printing methods.

Referring to FIGS. 1-21, a method of atomizing a mixed fluid, such as two or more adhesives may include the steps of providing a valve 100, 200 having a mixing element 50, 250 and an air cap 50, 250, wherein compressed air is supplied to the valve 100, 200 for atomizing the mixed fluid that exits the mixing element 50, 250.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A method comprising:

pumping, by operating a first rotor of a first pump, a first fluid through a first internal fluid pathway of a fluid body fastened to the first pump, directly to an outlet of the first internal fluid pathway that opens to an inlet of a mixer;

pumping, by operating a second rotor of a second pump, a second fluid through a second internal fluid pathway of the fluid body fastened to the second pump, directly to an outlet of the first internal fluid pathway that opens to the inlet of the mixer, wherein the second internal fluid pathway is fluidically separate and converges towards the first internal pathway within the fluid body, and the first rotor extends into the first internal fluid pathway and the second rotor extends into the second internal fluid pathway;

mixing, by the mixer, the first fluid and the second fluid to form a mixed fluid to be dispensed onto a target substrate;

introducing compressed air or gas through one or more ports located on a spray body that surrounds the mixer and is coupled to an attachment component that is fastened to the fluid body and used to secure the mixer to the fluid body; and atomizing the mixed fluid as the mixed fluid exits an outlet of the mixer, by controlling a flow of the compressed air or gas using an air cap that is coupled to the spray body, the air cap axially protruding from the spray body to surround the outlet of the mixer, the air cap having:

an air cap first end, an air cap second end, a vertical extension extending from the air cap first end to the air cap second end, an air cap collar disposed at the air cap first end and having external threads configured to engage internal threads of a second collar, a converging inlet surface proximate the air cap first end that continuously tapers towards the air cap second end to a location of the air cap that has a constant diameter such that an inner diameter of the air cap is gradually reduced from the air cap first end to the location of the air cap that has the constant inner diameter, the constant inner diameter extending until a converging outlet surface proximate the air cap second end that further reduces the inner diameter of the air cap, an outlet disposed at the air cap second end, the outlet being an opening adjacent to the converging outlet surface, a fluted inner surface that generates focused streams of compressed air, the fluted inner surface having at least one flute that extends between the location of the air cap that has the constant inner diameter and the converging outlet surface such that the fluted inner surface ends at a location within the air cap before reaching the outlet of the air cap, wherein the converging inlet surface gathers the compressed air entering the air cap from one or more inlet ports on the spray body and traveling through air passages located in the spray body, the compressed air then traveling in a laminar flow through the air cap and to act upon the mixed fluid as the mixed fluid exits the outlet of the mixer to atomize the mixed fluid yet keep a defined round spray pattern to impinge on the target substrate;

wherein the outlet of the mixer is arranged within the air cap so that the compressed air acts upon the mixed fluid before leaving the outlet of the air cap.

2. The method of claim 1, wherein the first pump, the second pump, the fluid body, the spray body, the mixer, and the attachment component are assembled together to form a valve attached to an end effector of a coating machine.

3. The method of claim 2, wherein a source of the first fluid and a source of the second fluid is located remotely from the end effector.

4. The method of claim 2, wherein a source of the first fluid and a source of the second fluid is attached to the end effector.

5. The method of claim 1, wherein the first pump has a first end, a second end, and the first rotor, the second pump has a first end, a second end, and the second rotor, and the second pump is arranged side-by-side with the first pump, in an assembled configuration.

6. The method of claim 1, wherein the first pump has a first end, a second end, and the first rotor, the second pump has a first end, a second end, and the second rotor, and the second pump is arranged in a V-formation with the first pump, in an assembled configuration.

7. The method of claim 1, wherein, as a function of the operating of the first rotor, the first fluid flows along the first rotor and is drawn through the first internal fluid pathway and through the first internal fluid pathway of the fluid body.

8. The method of claim 1, wherein, as a function of the operating of the second rotor, the second fluid flows along the second rotor and is drawn through the second internal fluid pathway.

9. The method of claim 1, wherein the first pump and the second pump are progressive cavity pumps.

10. The method of claim 1, wherein the first pump and the second pump each include an electrical port at the first end of the first pump and the second pump, respectively.

11. A method comprising:

coupling an end effector to an X axis actuator, a Y axis actuator, and a Z axis actuator of a coating machine, such that the end effector is capable of movement along at least three axes;

attaching a valve, having a top end and a bottom outlet end, to the end effector, the valve comprising:

a first pump having a first end, a second end, and a first rotor;

a second pump having a first end, a second end, and a second rotor, the second pump being arranged proximate the first pump;

a fluid body fastened to the first pump and the second pump, and including a first internal fluid pathway and a second internal fluid pathway that is fluidically separate and converge towards each other within the fluid body, wherein:

the first rotor of the first pump extends into the first internal fluid pathway such that a first fluid is drawn through the valve by operation of the first rotor flows along the first rotor and through the first internal fluid pathway of the fluid body directly to an outlet of the first internal fluid pathway, and the second rotor of the second pump extends into the second internal fluid pathway such that a second fluid drawn through the valve by operation of the second rotor flows along the second rotor and through the second internal fluid pathway of the fluid body directly to an outlet of the second internal fluid pathway;

a mixer disposed at an outlet of the first internal fluid pathway of the fluid body and an outlet of the second internal fluid pathway of the fluid body, the mixer having a first end and a second end, wherein the mixer combines the first fluid and the second fluid so that a mixed fluid exits the mixer through an outlet at the second end;

an attachment component coupled to the fluid body, the attachment component configured to securely attach the mixer to the fluid body;

a spray body coupled to the attachment component by a first collar, the spray body surrounding at least a portion of the mixer; and an air cap that extends from the spray body and disposed proximate an outlet of the mixer to atomize the mixed fluid exiting the outlet of the mixer and coupled to the spray body by a second collar, the air cap having:

an air cap coupled to the spray body by a second collar, the air cap protruding from the spray body toward the bottom outlet end of the valve along a longitudinal axis of the valve, and disposed proximate an outlet of the mixer to atomize the mixed fluid exiting the outlet of the mixer and coupled to the spray body by a second collar, the air cap having:

an air cap first end, an air cap second end that defines the bottom outlet end of the valve, a vertical extension extending from the air cap first end to the air cap second end, an air cap collar disposed at the air cap first end and having external threads configured to engage internal threads of the second collar, a converging inlet surface proximate the air cap first end that continuously tapers towards the air cap second end to a location of the air cap that has a constant diameter such that an inner diameter of the air cap is gradually reduced from the air cap first end to the location of the air cap that has the constant inner diameter, the constant inner diameter extending until a converging outlet surface proximate the air cap second end that further reduces the inner diameter of the air cap, an outlet disposed at the air cap second end, the outlet being an opening adjacent to the converging outlet surface, a fluted inner surface that generates focused streams of compressed air, the fluted inner surface having at least one flute that extends between the location of the air cap that has the constant inner diameter and the converging outlet surface such that the fluted inner surface ends at a location within the air cap before reaching the outlet of the air cap, wherein the converging inlet surface gathers the compressed air entering the air cap from one or more inlet ports on the spray body and traveling through air passages located in the spray body, the compressed air then traveling in a laminar flow through the air cap and, when exiting the outlet, acts upon the mixed fluid exiting the mixer to atomize the mixed fluid;

wherein the outlet of the mixer is arranged within the air cap so that the compressed air acts upon the mixed fluid before leaving the outlet of the air cap; and atomizing the mixed fluid as the mixed fluid exits the outlet of the mixer, by controlling a flow of the compressed air or gas using the air cap that surrounds the outlet of the mixer, such that the focused streams of compressed air travel in a laminar flow through the air cap and act upon the mixed fluid as the mixed fluid exits the outlet of the mixer to atomize the mixed fluid yet keep a defined round spray pattern to impinge on a target substrate.

12. The method of claim 11, further comprising: assembling the first pump, the second pump, the fluid body, the mixer, the attachment component, the spray body, and the air cap together to form a single assembled unit that is the valve attached to the end effector.

13. The method of claim 11, further comprising: introducing compressed air into the valve via one or more air inlet ports on the valve.

14. The method of claim 11, wherein the first pump and the second pump are progressive cavity pumps.

15. The method of claim 11, wherein a source of the first fluid and a source of the second fluid is located remote from the single assembled unit.

16. The method of claim 11, wherein a source of the first fluid and a source of the second fluid is attached to the valve.

17. The method of claim 11, wherein the first pump and the second pump each include an electrical port at the first end of the first pump and the second pump, respectively.

* * * * *